United States Patent [19]

Asakura et al.

[11] 4,395,386

[45] Jul. 26, 1983

[54] APPARATUS FOR ISOTOPE EXCHANGE REACTION

[75] Inventors: Yamato Asakura; Teiji Suzuki; Fumio Kawamura, all of Hitachi, Japan

[73] Assignee: Hitachi, Ltd., Tokyo, Japan

[21] Appl. No.: 129,753

[22] Filed: Mar. 12, 1980

[30] Foreign Application Priority Data

Mar. 13, 1979 [JP] Japan .................... 54-29082

[51] Int. Cl.³ .............. B01D 59/33; G21C 19/32
[52] U.S. Cl. ................ 423/249; 423/648 A; 376/301
[58] Field of Search ........... 176/37; 423/648 A, 249; 252/630; 261/79 A; 376/300, 301

[56] References Cited

U.S. PATENT DOCUMENTS

| | | | |
|---|---|---|---|
| 3,505,017 | 4/1970 | Roth | 176/37 |
| 3,761,065 | 9/1973 | Rich et al. | 261/79 A |
| 3,857,927 | 12/1974 | Henrie | 176/37 |
| 3,888,974 | 6/1975 | Stevens | 423/648 A |
| 3,961,920 | 6/1976 | Gilbert | 176/37 |
| 4,038,035 | 7/1977 | Ergenc et al. | 423/648 A |
| 4,126,667 | 12/1978 | Bulter et al. | 423/648 A |
| 4,143,123 | 3/1979 | Butler et al. | 423/648 A |
| 4,173,620 | 11/1979 | Shimizu | 176/37 |
| 4,217,332 | 8/1980 | Hindin et al. | 423/648 A |

FOREIGN PATENT DOCUMENTS

| | | |
|---|---|---|
| 49-18680 | 5/1974 | Japan. |
| 53-54696 | 5/1978 | Japan. |
| 53-54697 | 5/1978 | Japan. |

Primary Examiner—Sal Cangialosi
Attorney, Agent, or Firm—Antonelli, Terry & Wands

[57] ABSTRACT

An apparatus for isotope exchange reaction is used in an apparatus for removing tritium in heavy water-moderated nuclear reactors or heavy water production plants, and comprises a plurality of mist generators and a plurality of reactor columns, the mist generators and the reactor columns being alternately arranged and connected to one another successively in the alternate order. An ultra-sonic generator is provided each in the mist generators. A hydrophobic catalyst bed and a mist separator are provided each in the reactor columns. Water containing hydrogen isotopes to be removed is led into the mist generators to form mists. Mists of the water are supplied into the reactor columns together with hydrogen gas and isotope exchange reaction is carried out in the hydrophobic catalyst beds.

6 Claims, 4 Drawing Figures

APPARATUS FOR ISOTOPE EXCHANGE REACTION

BACKGROUND OF THE INVENTION

This invention relates to an apparatus for isotope exchange reaction, and particularly to an apparatus for isotope exchange reaction with a large treating capacity per unit volume of catalyst.

Heavy water-moderated nuclear reactors use heavy water as a moderator, and tritium (T) is liable to be generated by action of neutron [(n, γ) reaction]. Tritium is a radioactive isotope of hydrogen, and its behavior is substantially similar to that of hydrogen. It exists in the state of tritium oxide (tritium water) in heavy water. An increase in the proportion of tritium water gives rise to a risk that operators will absorb tritium into their bodies when heavy water containing tritium water is leaked from the system of heavy water-moderated nuclear reactor or when a heavy water-moderated nuclear reactor is subjected to maintenance and inspection, particularly at replacement work of system pipings. In order to prevent such a risk, an apparatus for removing tritium is provided in the heavy water-moderated nuclear reactor.

As general process for separating and recovering deuterium (D) and tritium (T) as hydrogen isotopes contained in a small amount in light water ($H_2O$) and tritium (T) contained in a small amount in heavy water ($D_2O$), there has been proposed a process utilizing an isotope exchange reaction between liquid water and hydrogen gas (Japanese Patent Publication No. 18680/74). The isotope exchange reaction between liquid water and hydrogen gas has a very low reaction rate, and thus it is necessary to use a hydrophobic catalyst having a catalyst surface of good contactibility with heavy water and deuterium gas to promote the reaction.

As an apparatus for isotope exchange reaction, there have been already proposed a water spray-type reactor column for isotope exchange reaction (which will be hereinafter referred to as "water spray-type reactor column") and a hydrogen gas bubbling-type reactor column for isotope exchange reaction (which will be hereinafter referred to as "hydrogen gas-bubbling type reactor column").

Separation and recovery of tritium in the water spray-type reactor column are carried out in the following manner.

Heavy water containing tritium water (DTO) is supplied to a hydrophobic catalyst bed in a reactor column from the top of the catalyst bed and undergoes countercurrent gas-liquid contact with hydrogen gas supplied into the hydrophobic catalyst bed from the bottom of the catalyst bed on the surface of the hydrophobic catalyst. At that time, the following isotope exchange reaction takes place:

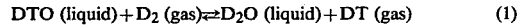

$$\text{DTO (liquid)} + D_2 \text{ (gas)} \rightleftharpoons D_2O \text{ (liquid)} + DT \text{ (gas)} \qquad (1)$$

When the tritium concentration of deuterium gas is sufficiently low, the reaction of equation (1) proceeds to the right side from the left side, and as a result tritium is separated from the heavy water containing tritium water.

The water spray-type reactor column is to improve the dispersibility of heavy water when supplied into the hydrophobic catalyst bed and enhance the reaction efficiency of isotope exchange reaction. Since the catalyst is hydrophobic, the heavy water supplied in a sufficiently dispersed state to the hydrophobic catalyst bed are formed into spherical water droplets in the hydrophobic catalyst bed according to its surface tension. The water droplets further undergo coagulation in the hydrophobic catalyst bed and gradually grow into larger water droplets. Thus, the flow of heavy water through the catalyst bed becomes very uneven, considerably deteriorating the gas-liquid contact efficiency on the surfaces of hydrophobic catalyst and lowering the efficiency of isotope exchange reaction shown by equation (1).

The hydrogen bubbling-type reactor column is disclosed in Japanese Laid-open Patent Applications Nos. 54696/78 and 54697/78, and is to improve the gas-liquid contact efficiency and enhance the reaction rate by conversion of heavy water in vapor in a gas state and reaction of the vapor with deuterium gas. That is, the deuterium gas flows through the reactor column from the bottom upwards whereas the heavy water flows down through the overflow conduit provided in the reactor column, flows over a perforated tray in the reactor column in a direction perpendicular to the flow direction of deuterium gas and falls onto another lower perforated tray through a one-stage lower overflow conduit. The deuterium gas is saturated with the water vapor when passed through the water accumulated on the perforated trays, becomes a mixture of deuterium and heavy water vapor and passes through the hydrophobic catalyst bed in the reactor column. At that time, the following hydrogen isotope exchange reaction takes place between the vapor of heavy water and deuterium.

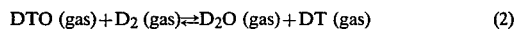

$$\text{DTO (gas)} + D_2 \text{ (gas)} \rightleftharpoons D_2O \text{ (gas)} + DT \text{ (gas)} \qquad (2)$$

Tritium in heavy water is transferred into deuterium gas thereby, and tritium in heavy water is removed.

In the hydrogen gas bubbling-type reactor column, a gas-liquid contact reaction between the vapor of heavy water and deuterium takes place in the catalyst bed, and thus the contact reaction between the heavy water in a gas state and deuterium gas can be made even, and the reaction efficiency of isotope exchange reaction can be considerably elevated. That is, tritium can be removed from heavy water with a good efficiency correspondingly. However, the capacity to treat the heavy water in the hydrogen gas bubbling-type reactor column depends upon the amount of saturating vapor in the deuterium gas, and consequently the hydrogen gas bubbling-type reactor column has such a disadvantage as a small capacity to treat heavy water per unit volume of the hydrophobic catalyst.

SUMMARY OF THE INVENTION

An object of the present invention is to provide an apparatus for isotope exchange reaction with a high isotope exchange reaction efficiency and a high treating capacity per unit volume of catalyst.

Another object of the present invention is to provide an apparatus for isotope exchange reaction with easy mist transfer.

Other object of the present invention is to provide an apparatus for isotope exchange reaction capable of removing mists with a good efficiency.

The present invention is characterized by providing a means for forming water containing isotopes of hydrogen, a catalyst bed for promoting isotope exchange reaction, to which at least one of hydrogen gas and deuterium gas is supplied and mists of the water discharged from the means for forming water into mists, and a means for removing the mists from the gas.

DESCRIPTION OF THE PREFERRED EMBODIMENTS

According to the present invention, water is made to be accompanied with hydrogen gas as fine particles of water in the mist state in place of being accompanied with hydrogen gas as water vapor in the molecular state, thereby making a gas-liquid contact even and increasing a treating capacity at the same time.

The present invention is considerably distinguished from the said conventional apparatus for isotope exchange reaction in the following points.

In the water spray-type reactor column, liquid water and hydrogen gas contact each other countercurrentwise in a hydrophobic catalyst bed, whereas in the present invention, the liquid water is accompanied with a hydrogen gas stream, and thus the contact is carried out cocurrentwise in the hydrophobic catalyst bed.

In the hydrogen gas bubbling-type reactor column, water is made to be accompanied with hydrogen gas as saturated water vapor, that is, water vapor gas in the molecular state, whereas in the present invention water is made to be accompanied with a hydrogen gas stream as water mists, that is, as fine particles of liquid water. The mists are the liquid existing in suspension in the gas.

Figure 1:
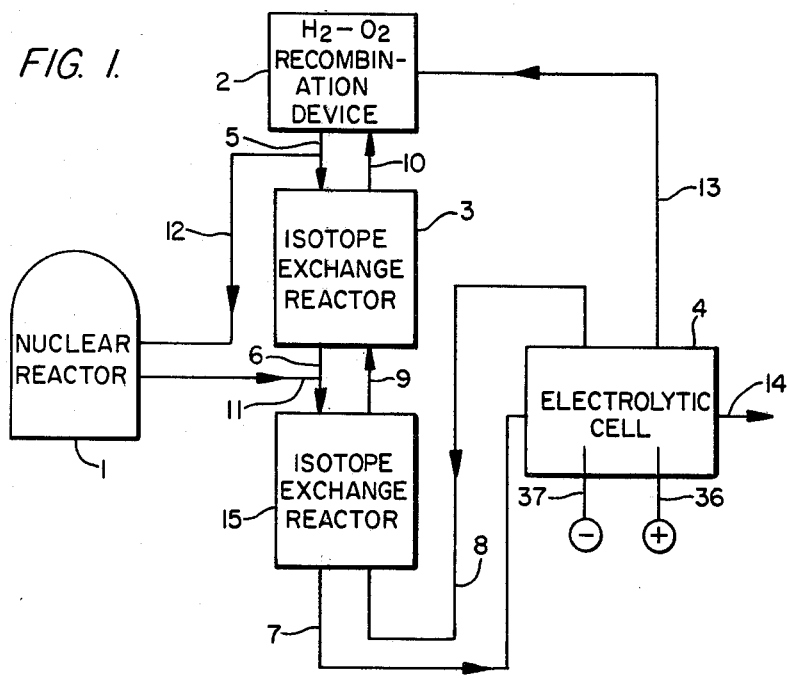
FIG. 1 is a flow diagram of an apparatus for removing tritium in a heavy water-moderated nuclear reactor, to which an apparatus for isotope exchange reaction, one preferable embodiment of the present invention, is applicable.

In FIG. 1, a system of the apparatus for removing tritium in a heavy water-moderated nuclear reactor is shown, where numeral 1 is a heavy water-moderated nuclear reactor and the apparatus for removing tritium contains a hydrogen-oxygen recombination device 2, an apparatus for isotope exchange reaction 3, an electrolytic cell 4 and another apparatus for isotope exchange reaction 15, where the hydrogen-oxgyen recombining device 2, the apparatus for isotope exchange reaction 3, the other apparatus for isotope exchange reaction 15 and the electrolytic cell 4 are connected to one another by conduits 5, 6 and 7, respectively. Conduits 8, 9 and 10 are also provided at the electrolytic cell 4, the apparatuses for isotope exchange reaction 15 and 3, and the hydrogen-oxygen recombination device 4. A conduit 13 connects the electrolytic cell 4 to the hydrogen-oxygen recombination device 2. A water feed conduit 11 connected to the water conduit 6 and a return conduit 12 connected to the conduit 5 are communicated with the heavy water-moderated nuclear reactor 1, respectively. A conduit 14 is provided at the electrolytic cell 4.

Detailed structure of the apparatus for isotope exchange reaction 15 will be described below, referring to FIG. 2. The apparatus for isotope exchange reaction 15 has a reactor column part of 20 trays comprised of pairs of reactor columns 16 and mist generators 19. That is, the apparatus for isotope exchange reaction 15 has 20 reactor columns 16A, 16B, ... 16T and 20 mist generators 19A, 19B, ... 19T. A hydrophobic catalyst bed 17 and a mist separator 18 are provided in the individual reactor columns 16. Heavy water 26 is accumulated in the individual reactor columns 16. The hydrophobic catalyst bed 17 is positioned at the upstream side of mist separator 18 with respect to the fluid flow. An ultrasonic generator 21 is provided in the vessels 20 of individual mist generators 19, and heavy water 29 is accumulated in the vessels 20. A conduit 6 is provided at the vessel 20 of mist generator 19A. Conduits 22 and 28 are connected to the vessel 20 of mist generator 19A above the liquid level 30 of heavy water 29. The conduit 22 is connected to the top of reactor column 16A. The conduit 28 is communicated with the zone between the mist separator 18 of reactor column 16B and the liquid level 33 of accumulated heavy water. A conduit 9 is communicated with the zone between the mist separator 18 of reactor column 16A and the liquid level 31 of accumulated heavy water. A heavy water conduit 23 provided at the reactor column 16A at the position of liquid level 31 of heavy water is connected to the vessel 20 of mist generator 19B. Conduits 24 and 27 are provided at the vessel 20 of mist generator 19B above the liquid level 32 of heavy water. The conduit 24 is connected to the top of the reactor column 16B. The conduit 27 is connected to the zone between the mist separator 18 of reactor column 16C (not shown in the drawing) positioned at the downstream side of the reactor column 16B with respect to the heavy water flow, and the liquid level of accumulated heavy water therein. A conduit 25 provided at the reactor column 16B at the position of liquid level 33 of heavy water is connected to the vessel 20 of mist generator 19C (not shown in the drawing).

Mist generators 19C to 19S and reactor columns 16C to 16S (not shown in the drawing) are alternately arranged at the downstream side of the reactor column 16B in the downstream direction of the flow of heavy water in the order of, for example, mist generator 19C, reactor column 16C, mist generator 19D, reactor column 16D, mist generator 19E, reactor column 16E, ... mist generator 19R, reactor column 16R, mist generator 19S and reactor column 16S. A conduit 38 provided at the reactor column 16S (not shown in the drawing) is connected to the vessel 20 of mist generator 19T. A conduit 26 and a conduit 8 are provided at the vessel 20 of mist generator 19T above the liquid level 34 of accumulated heavy water. The conduit 26 is connected to the top of reactor column 16T. A conduit 7 is provided at the reactor column 16T at the position of liquid level 35.

The apparatus for isotope exchange reaction 3 in FIG. 1 has the same structure as that of the apparatus for isotope exchange reaction 15, and has 20 reactor columns 16 and 20 mist generators 19. In the apparatus for isotope exchange reaction 3, the mist generators 19 are also positioned in the upstream side of reactor columns 16 with respect to the flow of heavy water.

The apparatus for removing tritium has such characteristics as a degree of concentration of 14 and a decontamination coefficient of 10. Function of the apparatus for removing tritium will be described below.

Heavy water having a tritium concentration of 1 ppm (10 Ci/l) is fed to the mist generator 19A through the heavy water feed conduit 11 and the conduit 6 from the heavy water-moderated nucler reactor 1. Heavy water having a tritium concentration of 1 ppm discharged from the apparatus for isotope exchange reaction 3 is also fed to the mist generator 19A. The ultrasonic generator 21 is made from a flat disc of barium titanate, 50 mm in diameter. The heavy water in the vessel 20 is formed into mists by vibration from the ultrasonic generator 21. Particle sizes of the mists are 1 μm, but can be adjusted in a range of 0.1 to 50 μm by changing the frequency of ultrasonic generator 21. The mists of heavy water containing tritium generated in the mist generator 19A are introduced into the reactor column 16A at its top through the conduit 22 together with deuterium gas containing tritium supplied through the conduit 28. The deuterium gas has a function to transport the mists. Thus, no pump is required for transporting the mists. The mists of heavy water and the deuterium gas flow into the hydrophobic catalyst bed 17 in the reactor column 16A. Isotope exchange reaction takes place through contact of the mists of heavy water with the deuterium gas in the hydrophobic catalyst bed 17. Temperatures of reactor columns 16A, 16B, ..., 16T are in a range of 30° to 70° C. At such a low temperature, the isotope exchange reaction takes place according to the following equation (3).

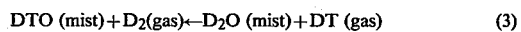
$$DTO \text{ (mist)} + D_2 \text{(gas)} \leftrightarrow D_2O \text{ (mist)} + DT \text{ (gas)} \quad (3)$$

That is, tritium in the deuterium gas and deuterium in the mists of heavy water are isotope-exchanged, and the tritium concentration of the mists of heavy water is increased thereby, whereas the tritium concentration of the deuterium gas is decreased. The fluid mixture stream of the mists of heavy water and the deuterium gas passes through the hydrophobic catalyst bed 17 and then hits the mist separator 18, which removes the mists of heavy water from the fluid mixture stream. The mists of heavy water are coagulated with each other to form droplets, which fall in the liquid layer of heavy water accumulated at the bottom of reactor column 16A. The deuterium gas having a decreased tritium concentration is discharged through the conduit 9. The heavy water 29 having an increased tritium concentration accumulated at the bottom of reactor column 16A is fed to the vessel 20 of mist generator 19B through the conduit 23. The heavy water is again formed into mists in the mist generator 19B. The generated mists containing the tritium is introduced into the reactor column 16B through the conduit 24 together with deuterium gas containing tritium supplied from the reactor column 16C (not shown in the drawing) through the conduit 27. The isotope exchange reaction takes place according to the reaction equation (3) in the hydrophobic catalyst bed 17 in the reactor column 16B, whereby the tritium concentration of the mists of heavy water is increased. The deuterium gas and the mists of heavy water are separated from each other in the mist separator 18. The deuterium gas having a decreased tritium concentration is discharged through the conduit 28. The mists of heavy water are coagulated with one another to form droplets and fall down onto the bottom of the reactor column 16B. The heavy water accumulated in the reactor column 16B is led to the mist generator 19C (not shown in the drawing) through the conduit 25 and further formed into mists. The above-mentioned function are thereafter repeated in the reactor column 16C, mist generator 19D, reactor column 16D, mist generator 19E, reactor column 16E, ..., mist generator 19R, reactor column 16R, mist generator 19S, and reactor column 16S (not shown in the drawing), whereby the tritium concentration of heavy water is gradually increased. The heavy water accumulated at the bottom of reactor column 16S (not shown in the drawing) is led to the mist generator 19T through the conduit 38 and formed into mists. The generated mist of heavy water is led to the reactor column 16T through the conduit 26 together with the deuterium gas containing tritium introduced through the conduit 8. The mists of heavy water and the deuterium gas undergo isotope exchange reaction shown by reaction equation (3) in the hydrophobic catalyst bed 17 in the reactor column 16T. The tritium concentration of the mists of heavy water is further increased thereby. The deuterium gas freed from the mists through the mist separator 18 is discharged through the conduit 27. The separated mists of heavy water are coagulated into droplets and fall down onto the bottom of reactor column 16T. The heavy water accumulated on the bottom of reactor column 16T is discharged through the conduit 7. The tritium concentration is gradually increased through the succession of 20 reactor columns 16A, 16B, ..., 16T of the apparatus for isotope exchange reaction 15, and consequently the tritium concentration of the heavy water passing through the conduit 7 becomes 10 ppm. That is, the apparatus for isotope exchange reaction 15 can increase the tritium concentration of heavy water from 1 ppm to 10 ppm, that is, to be ten-fold concentration. The heavy water is led to the electrolytic cell 4 through the conduit 7. An anode 36 and a cathode 37 are provided in the electrolytic cell 4. The heavy water is electrolyzed into deuterium gas and oxygen gas by applying a potential to between the electrodes 36 and 37. The deuterium gas generated by electrolysis is discharged therefrom through the conduit 8, and the oxygen gas through the conduit 13. The tritium concentration of heavy water in the electrolytic cell is further increased, thanks to such an isotope effect that tritium water is less liable to be electrolyzed than heavy water, but a portion of tritium water is electrolyzed nevertheless, and the deuterium gas containing tritium is discharged through the conduit 8. The tritium concentration of deuterium gas passing through the conduit 8 is 9 ppm.

The deuterium gas containing tritium is supplied to the apparatus for isotope exchange reaction 15, that is, the above-mentioned mist generator 19T, through the conduit 8. The tritium concentration of deuterium gas is gradually decreased by isotope exchange reaction with the mists of heavy water through the succession of 20 reactor columns, 16T, ..., 16B and 16A of the apparatus for isotope exchange reaction 15, as described above. The tritium concentration of deuterium gas discharged from the reactor column 16A through the conduit 9 is 0.8 ppm.

The discharged deuterium gas is led to the apparatus for isotope exchange reaction 3 through the conduit 9. The deuterium gas is led to the mist generator 19 positioned at the most downstream side with respect to the flow of heavy water in the apparatus for isotope exchange reaction 3, and then supplied to a reactor column 16 together with the mists of heavy water supplied to said mist generator 19. Isotope exchange reaction shown by reaction equation (3) takes place between the deuterium gas and the mists of heavy water through the hydrophobic catalyst bed 17 in the reactor column 16, whereby the tritium concentration of deuterium gas is decreased, whereas the tritium concentration of heavy water is increased.

The deuterium gas having a lowered tritium concentration discharged from the reactor column 16 is supplied to another mist generator positioned at the upstream side with respect to the flow of heavy water. Then, the deuterium gas passes through a succession of reactor columns 16 and mist generators 19 in an alternate arrangement, that is, through such a route of the conduit 24, reactor column 16, conduit 28 and mist generator 19A as shown in FIG. 2, and reaches the reactor column positioned at the most upstream side with respect to the flow of heavy water in the apparatus for isotope exchange reaction 3. The deuterium gas having an ultimate tritium concentration of 0.1 ppm is led to the hydrogen-oxygen recombination device 2 through the conduit 10. In the hydrogen-oxygen recombination device 2, the deuterium gas reacts with the oxygen gas supplied through the oxygen conduit 13 to form heavy water. The tritium concentration of the formed heavy water is 0.1 ppm. A portion of the heavy water (tritium concentration: 0.1 ppm) discharged from the hydrogen-oxygen recombination device 2 is returned to the heavy water-moderated nuclear reactor through the conduit 5 and the heavy water return conduit 12. Tritium can be removed from the heavy water in the heavy water-moderated nuclear reactor 1 thereby. The remaining heavy water discharged from the hydrogen-oxygen recombination device is supplied to the mist generator 19 positioned at the most upstream side with respect to the flow of heavy water in the apparatus for isotope exchange reaction 3 through the conduit 5 and formed into mists. As already described referring to FIG. 2, the generated mists of heavy water is supplied to the reactor column 16 together with the deuterium gas supplied to the mist generator 19. Isotope exchange reaction shown by reaction equation (3) takes place in the hydrophobic catalyst bed 17, whereby the tritium concentration of heavy water is increased. That is, in the apparatus for isotope exchange reaction 3, formation of mists of heavy water in 20 mist generators 19 and isotope exchange reaction between the mists of heavy water and deuterium gas discharged from the apparatus for isotope exchange reaction 15, on the basis of reaction equation (3) in 20 reactor columns 16 are alternately repeated toward the downstream side with respect to the flow of heavy water, whereby the tritium concentration of heavy water is gradually increased. In the apparatus for isotope exchange reaction 3, the tritium concentration of heavy water is increased from 0.1 ppm to 1 ppm.

The heavy water having a tritium concentration of 1 ppm discharged from the apparatus for isotope exchange reaction is supplied to the apparatus for isotope exchange reaction 15 through the conduit 6.

The apparatus for isotope exchange reaction 15 is a concentration section, and the apparatus for isotope exchange reaction 3 is a stripping section. The heavy water having an increased tritium concentration of 14 ppm in the electrolytic cell 4 is withdrawn through the conduit 14 and stored. It is also possible to lead the heavy water withdrawn through the conduit 14 further to a liquefaction-distillation column (not shown in the drawing) to further concentration of tritium.

According to the present embodiment of supplying the mists of heavy water and the deuterium gas to the hydrophobic catalyst bed to effect isotope exchange reaction, an isotope exchange reaction efficiency is high, and a capacity to treat heavy water per unit volume of the hydrophobic catalyst in the apparatuses for isotope exchange reaction 3 and 5 is increased.

Figure 3:
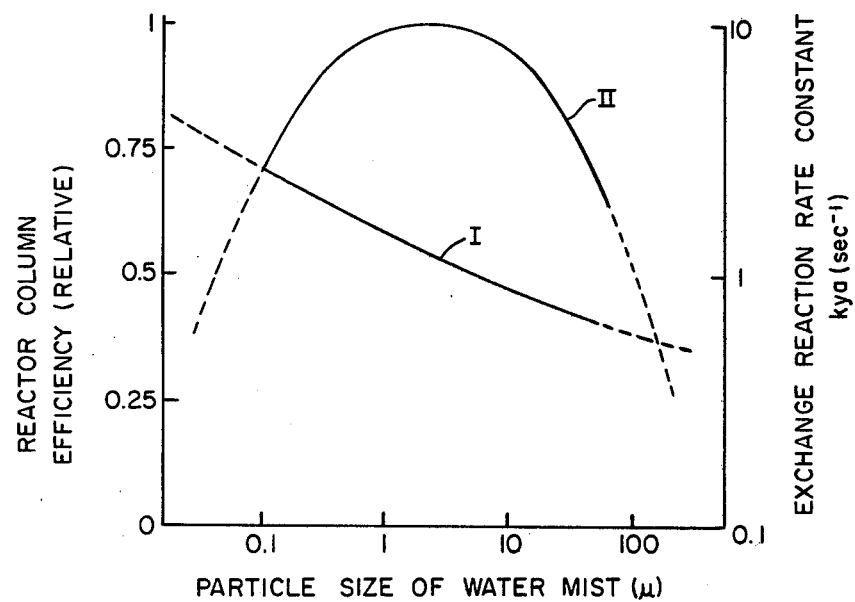
FIG. 3 is a characteristic diagram showing changes in reactor column efficiency and exchange reaction rate constant by particle size of water mist.

FIG. 3 is a characteristic diagram showing dependence of exchange reaction rate constant (Kya) and reactor column efficiency (effective volume of heavy water treated per unit volume of catalyst) upon particle size of water mists when heavy water consisting of 10% tritium water and 90% heavy water is subjected to isotope exchange reaction with 100% deuterium gas, where 0.5% by weight of platinum as catalytic metal supported on a porous teflon tube as hydrophobic carrier (the tube is 5 mm in diameter, 5 mm long and 1 mm thick with a 50% porosity) is used as hydrophobic catalyst. In FIG. 3, characteristic curve I shows the exchange reaction rate constant, and characteristic curve II the reactor column efficiency.

When tritium concentrations of deuterium gas at the inlet and outlet of the catalyst bed are designated by $Y_{in}$ and $Y_{out}$, respectively, and a tritium concentration of deuterium gas in a gas-liquid equilibrium state by $Y_{eq}$, the exchange reaction rate constant ($K_{ya}$) can be calculated according to the following equation (4):

$$K_{ya} = \frac{F}{h} [-\ln(1-\eta)] \quad (4)$$

$$\eta = (Y_{in} - Y_{out})/(Y_{in} - Y_{eq}) \quad (5)$$

where F is a deuterium gas flow speed (m/sec) and h is the height of the hydrophobic catalyst bed (m).

The reactor column efficiency can be calculated according to the following equation (6) as an effective treating capacity per unit volume of catalyst.

Reactor column efficiency $\propto (K_{ya}) \times$ (volume of treated heavy water/volume of catalyst) \quad (6)

In FIG. 3, the reactor column efficiency is shown as a ratio to the maximum value of the reactor column efficiency.

As is obvious from FIG. 3, the exchange reaction rate constant tends to simply increase with decreasing particle size of mists of heavy water. Thus, it can be presumed that the exchange reaction rate constant will have a maximum value in the conventional hydrogen gas bubbling-type reactor column where heavy water exists as water vapor in the molecular state, and a minimum value in the conventional water spray-type reactor column, where sizes of water droplets are about 1 mm. On the other hand, the reactor column efficiency as an important index for designing the apparatus has a maximum value when the particle size of the mists is a few $\mu$m, and thus it can be presumed that the reaction rate constants in both the hydrogen bubbling-type reactor column having a small treating capacity per unit volume of hydrophobic catalyst and the water spray-type reactor column having a small reaction rate constant will be smaller than the reactor column efficiency according to the present system of forming heavy water to be formed into mists.

Quantitative effects of the apparatus for removing tritium for the heavy water-moderated nuclear reactor shown in FIG. 1 by applying the present isotope exchange reaction by formation of heavy water into mists thereto will be described below. The apparatus for removing tritium has such conditions as:

Capacity to treat heavy water containing tritium: 100 l/hr
Tritium separation coefficient: 10
Treating temperature: 20° C.
Linear velocity of deuterium gas: 0.2 m/sec
Molar flow ratio of heavy water to deuterium gas (L/G): 0.8

In the case of removing tritium under said conditions, reactor columns for isotope exchange reaction necessary for the apparatus for removing tritium have dimensions and particulars as given in the following table.

TABLE

| Items | Reactor column type | | |
|---|---|---|---|
| | Water spray-type | Hydrogen gas bubbling type | Present water mist contact type |
| $K_{ya}$ (sec$^{-1}$) | 0.4 | 5 | 1.3 |
| HETP (m) | 2 | 0.05 | 0.25 |
| Theoretical number of stages (reactor columns) | 20 | 20 | 20 |
| Thickness of total catalyst beds in 20 reactor columns (m) | 40 | 1 | 5 |
| Diameter of single reactor columns (m) | 0.4 | 2.5 | 0.4 |
| Total volume of catalyst beds in 20 reactor columns (m$^3$) | 42 | 39 | 5 |

In the table, the exchange reaction rate constant $K_{ya}$ depends upon catalyst activity, gas-liquid contact efficiency and linear velocity of deuterium gas. However, since the identical catalyst is used in the test, the catalyst activity is constant, and since the deuterium gas linear velocity is also constant, the exchange reaction rate constant $K_{ya}$ has a maximum value in the hydrogen gas bubbling-type reactor columns with a good contact efficiency due to the gas-gas contact reaction between the water vapor and hydrogen gas and a minimum value in the water spray-type reactor columns with a poor contact efficiency due to the gas-liquid contact reaction, as shown in the table.

The thickness of total catalyst beds in reactor columns can be defined by the product of HETP multiplied by theoretical number of stages (reactor columns). HETP is inversely proportional to the exchange reaction rate constant $K_{ya}$, as shown in the table, if the molar flow ratio of heavy water to deuterium gas (L/G) is constant. The theoretical number of stages (reactor columns) can be theoretically calculated, as shown in the table, when the separation coefficient, treating temperature, and molar flow ratio of heavy water to deuterium gas (L/G) are set for the apparatus for isotope exchange reaction. That is, the thickness of total catalyst beds in 20 reactor columns is the smallest in the hydrogen gas bubbling-type reactor column and the largest in the water spray-type reactor column, as shown in the table.

On the other hand, the diameter of single reactor column depends upon the gas flow rate and gas linear velocity. In the hydrogen gas bubbling-type reactor column, the volume of heavy water contained per unit volume of deuterium gas is small (saturated water vapor at 20° C.), and the volume of gas (deuterium gas) necessary for treating the same volume of heavy water as in the reactor columns of other type is increased to 40-fold. Thus, the diameter of reactor column is about 6 times as large as that of reactor column of other types, as shown in the table.

That is, the water spray-type reactor column can reduce the diameter of single reactor column, but the thickness of total catalyst beds in reactor columns is much increased. The hydrogen gas bubbling-type reactor column can much shorten the thickness of total catalyst beds in reactor columns, but its diameter is much increased.

Figure 2:
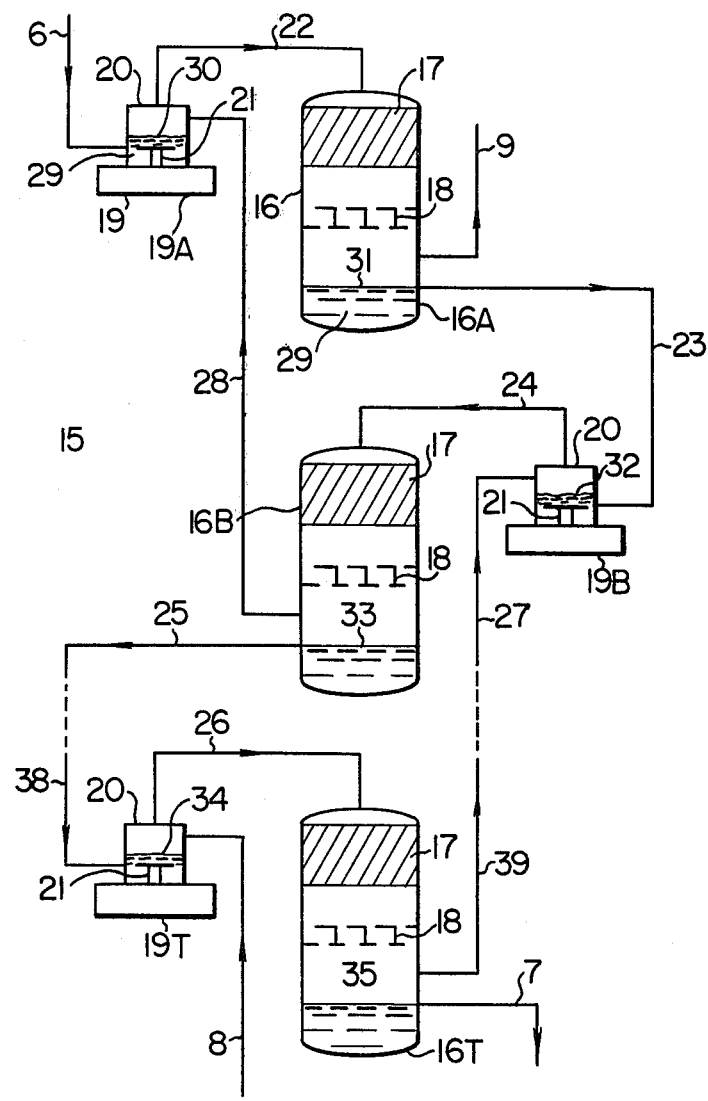
FIG. 2 is a detailed flow diagram of the apparatus for isotope exchange reaction shown in FIG. 1.

On the other hand, the present reactor column of water mist type shown in FIG. 2 can make the diameter equal to that of the water spray-type reactor column, and can also shorten the thickness of total catalyst beds in reactor columns, which is nearly equal to the total thickness of the hydrogen gas bubbling-type reactor columns. Thus, in the present reactor column, the volume of hydrophobic catalyst necessary for treating the same volume of heavy water can be made smallest, as shown in the table.

Mists of heavy water can be readily removed from deuterium gas by providing the mist separator 18 below the hydrophobic catalyst bed 17 in the reactor column 16, as shown in FIG. 2, because the mists removed through the mists separator 18 fall down after coagulation into droplets.

Figure 4:
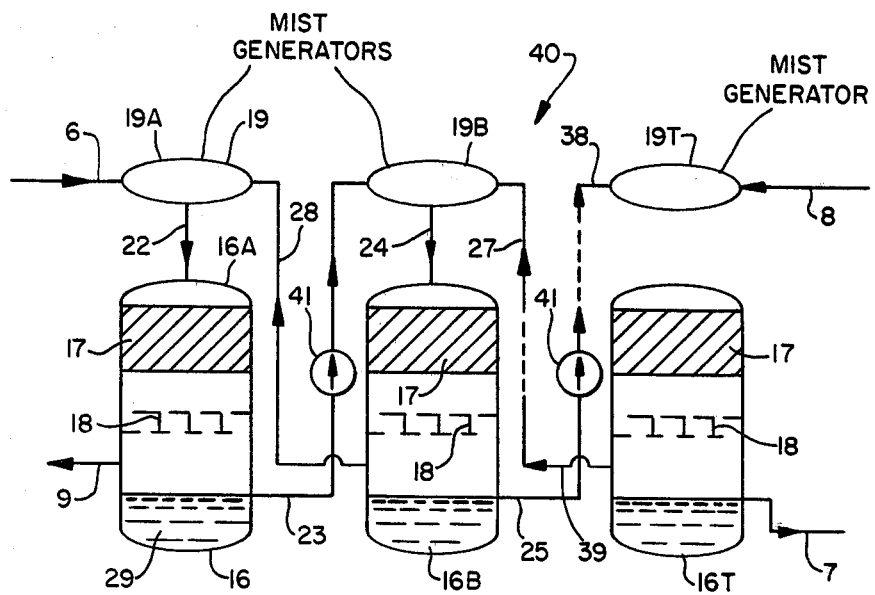
FIG. 4 is a flow diagram of another embodiment of an apparatus for isotope exchange reaction according to the present invention.

Another embodiment of the present apparatus for isotope exchange reaction is shown in FIG. 4. The apparatus for isotope exchange reaction 15 shown in FIG. 2 is comprised of arranging 20 reactor columns 16 successively in a vertical direction, whereas the apparatus for isotope exchange reaction shown in FIG. 4 is comprised of arranging 20 reactor columns 16, each coupled with a mist generator 19, in a horizontal direction, where the same members as in FIG. 2 are identified with the same reference numerals. Numeral 41 is pumps, which are provided in conduits connecting the reactor column 16 to the mist generator 19 positioned at the downstream side with respect to the flow of heavy water, such as conduits 23 and 25, to supply the heavy water from the reactor column 16 to the mist generator 19 positioned at the downstream side.

In the apparatus for isotope exchange reaction 40, isotope exchange reaction also takes place between the mists of heavy water and deuterium gas under the same action as in the apparatus for isotope exchange reaction 15. That is, the heavy water containing tritium supplied into the apparatus for isotope exchange reaction 40 through the conduit 6 passes through mist generator 19A, reactor column 16A, mist generator 19B, reactor column 16B, . . . , mist generator 19T, and reactor column 16T, successively. The tritium concentration of heavy water is gradually increased in the apparatus for isotope exchange reaction 40 through alternate repetitions of mist generation and isotope exchange reaction between the generated mists and the deuterium gas supplied from the electrolytic cell 4.

The present embodiment can facilite construction of an apparatus for isotope exchange reaction. That is, arrangement of a plurality of reactor columns in a vertical direction requires a correspondingly rigid support structure. The higher the support structure, the more time is required for installing the reactor columns onto the support structure. The present embodiment can eliminate such troubles.

In the foregoing embodiments, the present apparatus for isotope exchange reaction is applied to the apparatus for removing tritium for a heavy water-moderated nuclear reactor. The present apparatus for isotope exchange reaction can be also applied to an apparatus for producing heavy water, as described in Japanese Laid-open Patent Application No. 54696/78. Function of an apparatus for producing heavy water will be described, referring to FIG. 1, and function of the apparatus for isotope exchange reaction applied to an apparatus for producing heavy water will be described, referring to FIG. 2.

The heavy water-moderated nuclear reactor 1 shown in FIG. 1 is not necessary for an apparatus for producing heavy water. In the apparatus for producing heavy water, the heavy water feed conduit 11 will be a light water feed conduit, and the heavy water return conduit 12 will be a light water discharge conduit.

Natural light water supplied from the light water feed conduit 11 is led to the mist generator 19A in the apparatus for isotope exchange reaction 15 through the conduit 6. The natural light water contains a very small amount of deuterium, and the deuterium concentration of light water can be increased in the apparatus for isotope exchange reaction 15. The light water is formed into mists by the ultrasonic generator 21 in the mist generator 19A. The generated mist of light water is led to the reactor column 16A through the conduit 22 together with the hydrogen supplied through the conduit 28. Temperature of hydrophobic catalyst bed 17 is kept in a range of 20° to 70° C. Isotope exchange reaction takes place in the hydrophobic catalyst bed 17 according to the following reaction equation (7):

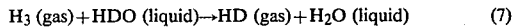

$$H_3 \text{ (gas)} + HDO \text{ (liquid)} \rightarrow HD \text{ (gas)} + H_2O \text{ (liquid)} \quad (7)$$

The mists of light water having an increased deuterium concentration are separated from the gas through the mist separator 18.

Mist generation of light water and isotope exchange reaction shown by equation (7) are then alternately repeated in the individual mist generators 19 and the reactor columns 16 in the same manner as in the foregoing embodiments, whereby the deuterium concentration of light water is gradually increased.

The light water having an increased deuterium concentration is led to the electrolytic cell 4 from the reactor column 16T of the apparatus for isotope exchange reaction through the conduit 7. The light water is electrolyzed by applying a potential to between the electrodes 36 and 37, and hydrogen gas is discharged through the conduit 8 and oxygen gas through the conduit 13. The deuterium concentration of light water in the electrolytic cell 4 is increased thanks to such an isotope effect that heavy water is less liable to be electrolyzed than light water, but a portion of heavy water contained in the light water is electrolyzed nevertheless, and the deuterium generated thereby is also discharged through the conduit 8. The hydrogen gas containing the deuterium gas is led to the apparatus for isotope exchange reaction 15 through the conduit 8. Isotope exchange reaction takes place in the reactor columns 16, as described above. The hydrogen gas having a decreased deuterium concentration is led to the apparatus for isotope exchange reaction 3 through the conduit 9, and isotope exchange reaction takes place between the hydrogen gas and the light water supplied to the apparatus for isotope exchange reaction 3 according to equation (7).

The hydrogen gas having a further decreased deuterium concentration is led to the hydrogen-oxygen recombination device 2 from the apparatus for isotope exchange reaction 3 through the conduit 10. The light water to be supplied to the apparatus for isotope exchange reaction 3 is prepared by reaction of the hydrogen gas supplied through the conduit 10 with the oxygen gas supplied through the conduit 13 in the hydrogen-oxygen recombination device 2. A portion of light water discharged from the hydrogen-oxygen recombination device 2 is discharged to the outside through the light water discharge conduit 12. The light water having an increased deuterium concentration, that is, an increased heavy water proportion, is withdrawn from the electrolytic cell 4 through the conduit 14.

In the present embodiment, similar distinguished effects to those of the apparatus for removing tritium for a heavy water-moderated nuclear reactor as shown in FIGS. 1 and 2 can be also obtained.

According to the present invention, a treating capacity per unit volume of catalyst can be increased with an increased isotope exchange reaction efficiency.

What is claimed is:

1. An apparatus for isotopic exchange reaction, which comprises a plurality of units arranged in succession, each unit comprising a mist-forming means for forming water containing hydrogen isotopes into a mist of fine water particles containing hydrogen isotopes, said mist having a fine particle size of from 0.1 μm to 50 μm, a catalyst bed for promoting isotope exchange reaction between at least one of hydrogen gas and deuterium gas, and the hydrogen isotopes in the mist of fine water particles supplied in a mixed state from the mist-forming means, means for removing the mist from the gas passed through the catalyst bed, a first conduit leading the water containing hydrogen istopes to the mist-forming means, a second conduit for discharging the gas freed from the mist by the mist-removing means, and a third conduit for discharging the mist collected by the mist-removing means as a liquid containing hydrogen isotopes; the mist-forming means of a preceeding unit being connected to the second conduit of a succeeding unit and the third conduit of the preceeding unit being connected to the first conduit of the succeeding unit.

2. An apparatus according to claim 1, wherein said mist-forming means forms the water containing hydrogen isotopes into a mist of fine particles having a particle size of from 1 μm to 10 μm.

3. An apparatus according to claim 1, wherein the catalyst bed and the means for removing the mist in each unit are provided in a vessel, and the means for removing the mist is positioned at the downstream side of the catalyst bed with respect to the flow of the mixture of the mist and the gas through said unit.

4. An apparatus according to claim 3, wherein a conduit for feeding the mist and the gas from said mist-forming means is connected to the upper part of the vessel, and the catalyst bed and the means for removing the mist are arranged in succession vertically from the connection of said feed conduit to the vessel.

5. An apparatus according to claim 1 or 2, wherein the catalyst bed is a hydrophobic catalyst bed.

6. An apparatus according to claim 5, wherein a catalyst for the hydrophobic catalyst bed is a metallic catalyst supported on a hydrophobic carrier.

* * * * *